Feb. 9, 1937.　　　W. J. PASINSKI　　　2,070,059
CASH REGISTER
Filed Sept. 15, 1933　　　8 Sheets-Sheet 1
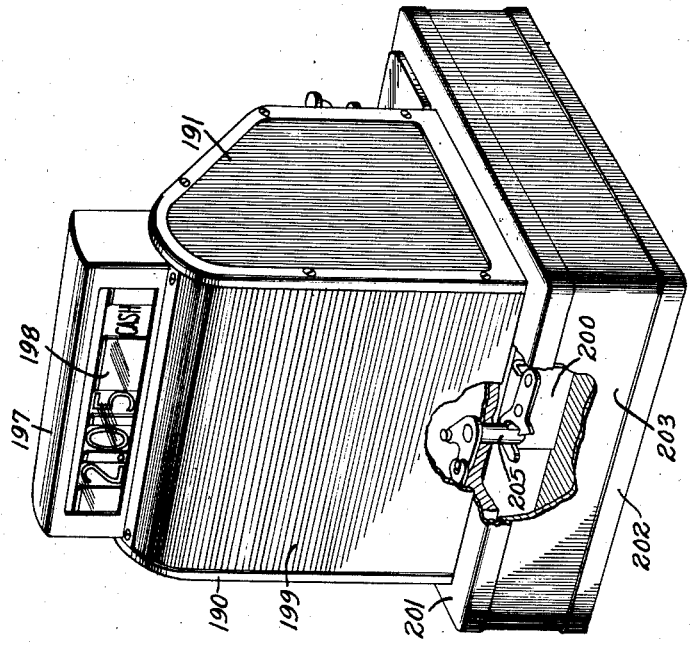
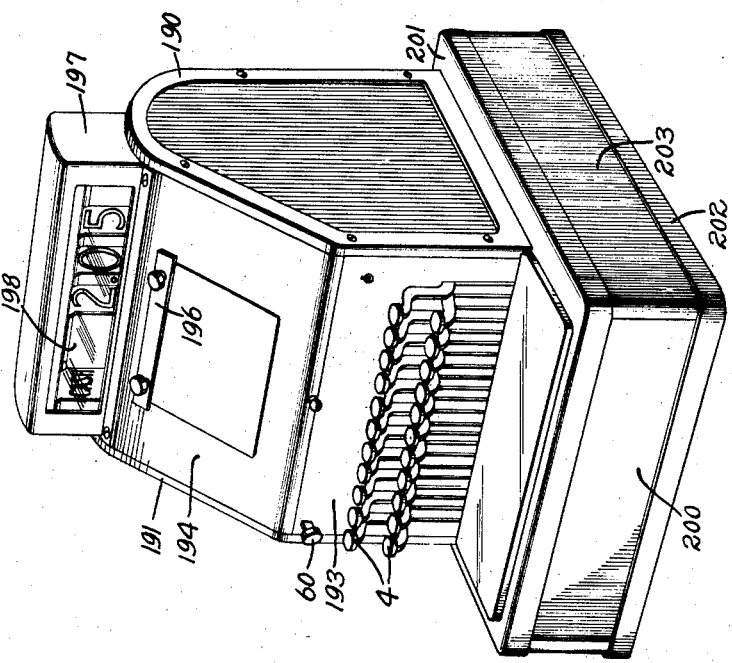
INVENTOR
Walter J. Pasinski
BY
Rector, Hibben, Davis & Macauley
ATTORNEYS

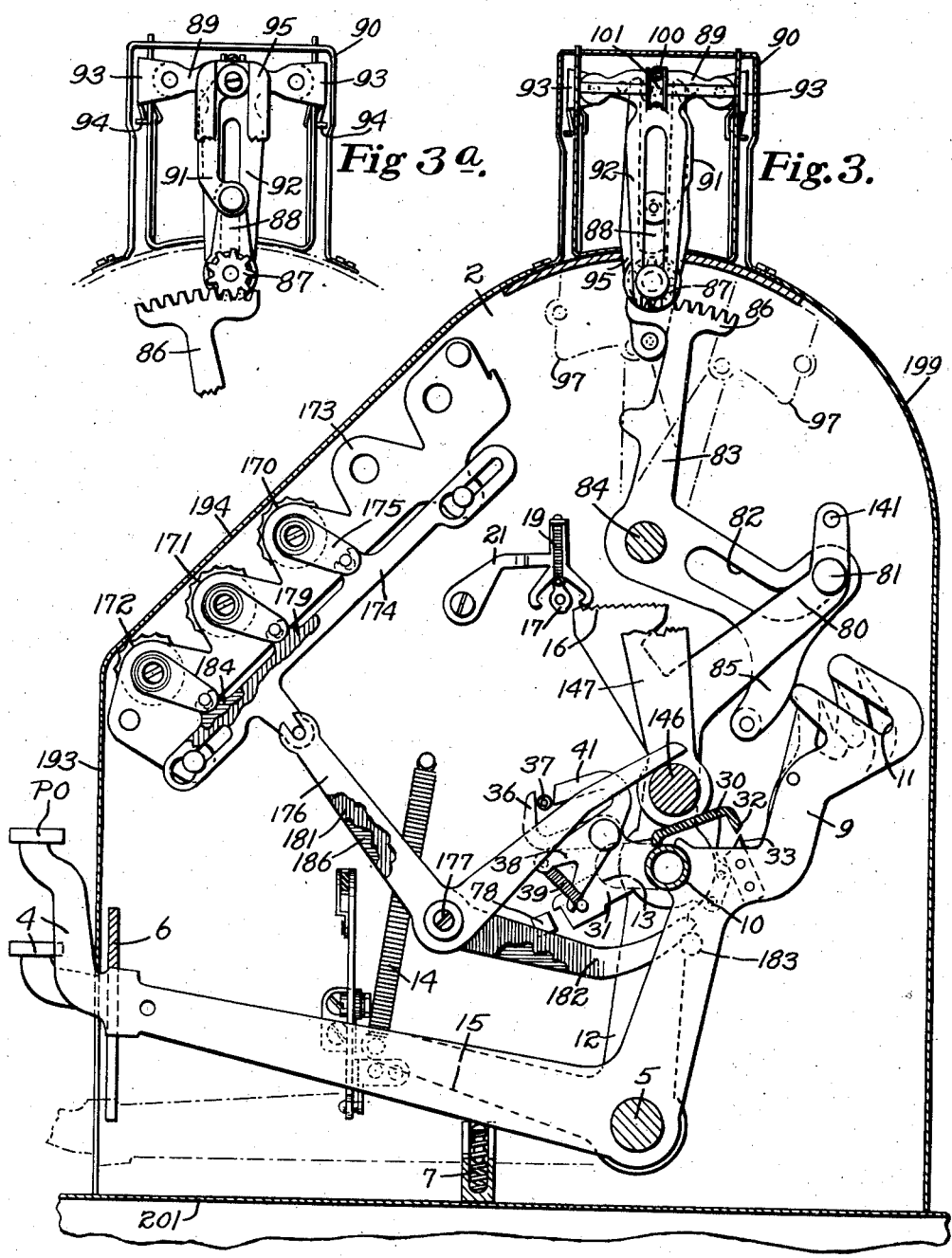

Feb. 9, 1937.  W. J. PASINSKI  2,070,059
CASH REGISTER
Filed Sept. 15, 1933     8 Sheets-Sheet 3

INVENTOR
Walter J. Pasinski
BY
Rector, Hibben, Davis & Macauley
ATTORNEYS

Feb. 9, 1937.  W. J. PASINSKI  2,070,059
CASH REGISTER
Filed Sept. 15, 1933   8 Sheets-Sheet 5

INVENTOR
Walter J. Pasinski
BY
Rector, Hibben, Davis & Macauley
ATTORNEYS

Feb. 9, 1937.  W. J. PASINSKI  2,070,059
CASH REGISTER
Filed Sept. 15, 1933  8 Sheets-Sheet 7

INVENTOR
Walter J. Pasinski
BY
Rector, Hibben, Davis & Macauley
ATTORNEYS

Feb. 9, 1937.  W. J. PASINSKI  2,070,059
CASH REGISTER
Filed Sept. 15, 1933  8 Sheets-Sheet 8

INVENTOR
Walter J. Pasinski
BY
Rector, Hibben, Davis & Macauley
ATTORNEYS

Patented Feb. 9, 1937

2,070,059

UNITED STATES PATENT OFFICE 2,070,059

CASH REGISTER

Walter J. Pasinski, Detroit, Mich., assignor to Burroughs Adding Machine Company, Detroit, Mich., a corporation of Michigan Application September 15, 1933, Serial No. 689,656

8 Claims. (Cl. 235—15)

This invention relates to cash registers and more particularly to key operated cash registers in which depression of an amount key actuates the cash register as distinguished from those cash registers which are motor or spring operated, although it will be manifest that some at least of the novel features of this invention which contribute toward the results obtained thereby may be applicable to other types of cash registers.

In many instances cash registers are in continuous service, that is, they are continuously operated by one operator over a period of several hours. For example, in cafeteria or restaurant service there is a continuous passage of customers or waiters by one or more cashiers or food checkers over a period of several hours.

In such services as these it is highly desirable, if not necessary, that the key action of the register be very easy, both as to a light touch and uniform key depression pressure throughout the full stroke of the keys.

It is the general purpose of this invention therefore to provide an improved cash register, particularly with respect to the ease of operation, both as to light touch and uniform key action.

Other objects will appear to those skilled in the art as a consequence of the many novel features of construction, arrangement and combination of elements from the following description given in connection with the drawings in which,—

Figure 1 is a front perspective of a cash register embodying the features of this invention;

Fig. 2 is a rear perspective of a similar cash register illustrating the direct reading of the indicated tabs from the rear and partly broken away to indicate the drawer latch;

Fig. 3 is a right side sectional elevation with the casing removed illustrating the item counter controls and the raising and lowering means for the indicator tabs in normal position;

Figure 4:
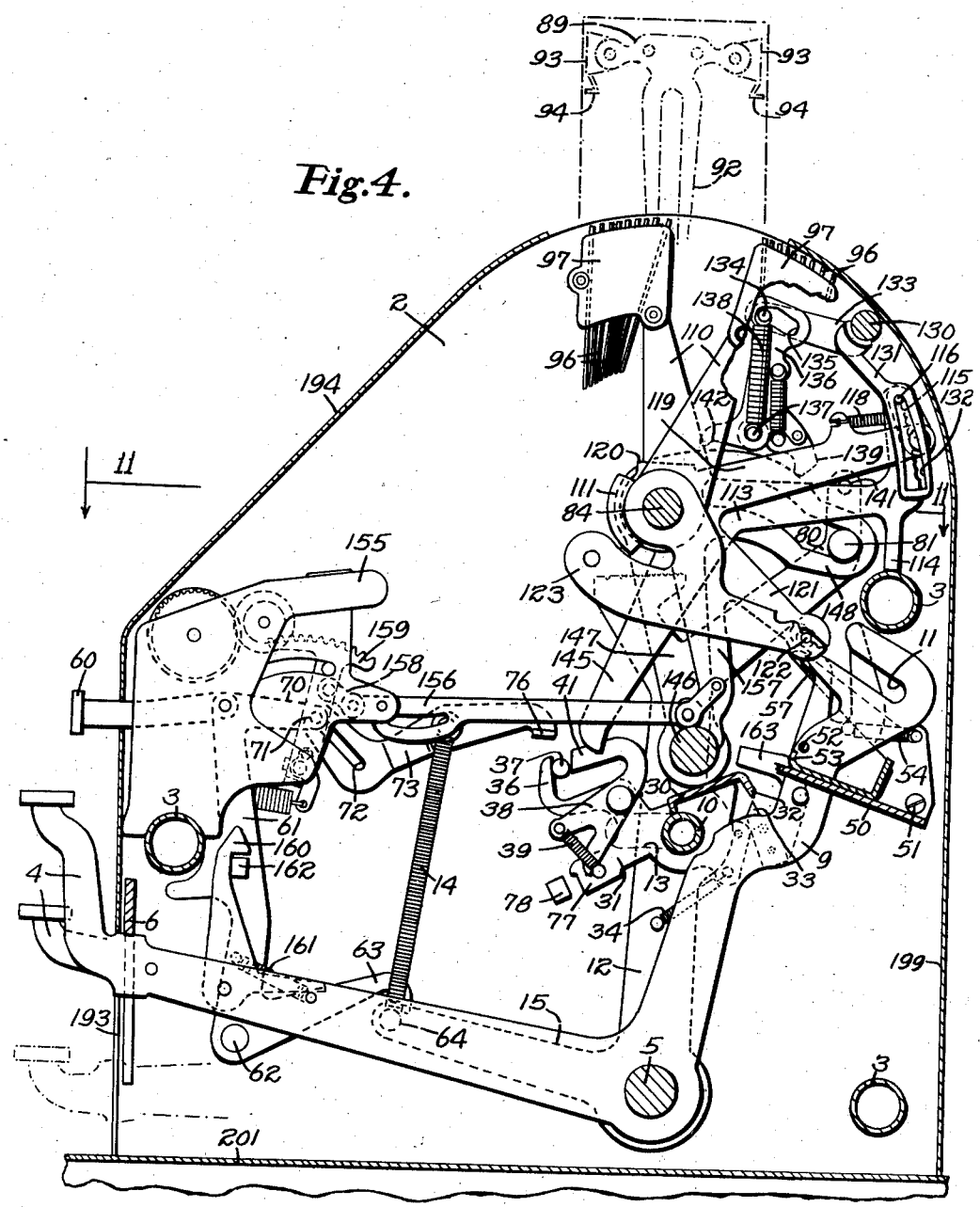
Figure 5:
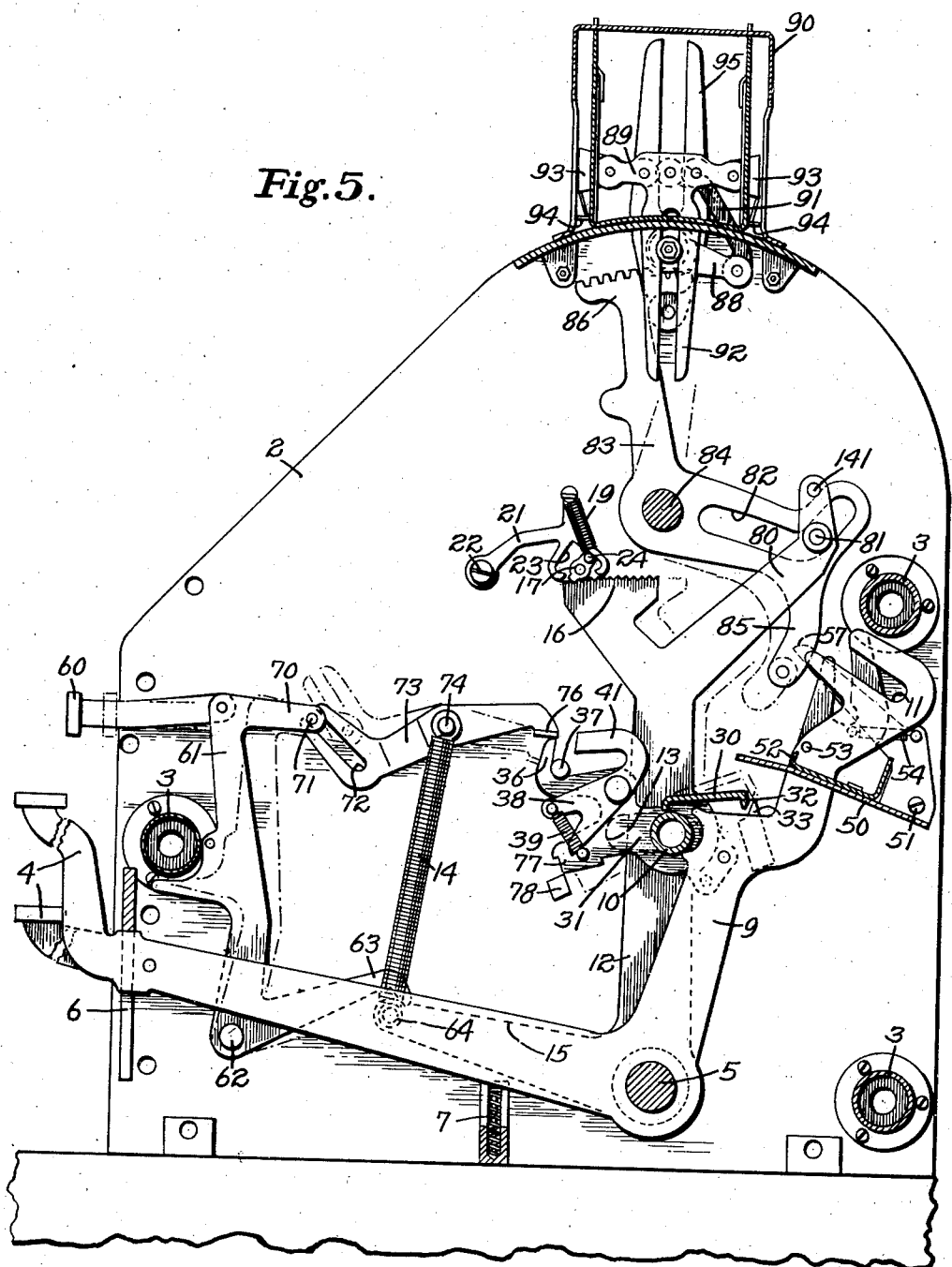
Figure 6:
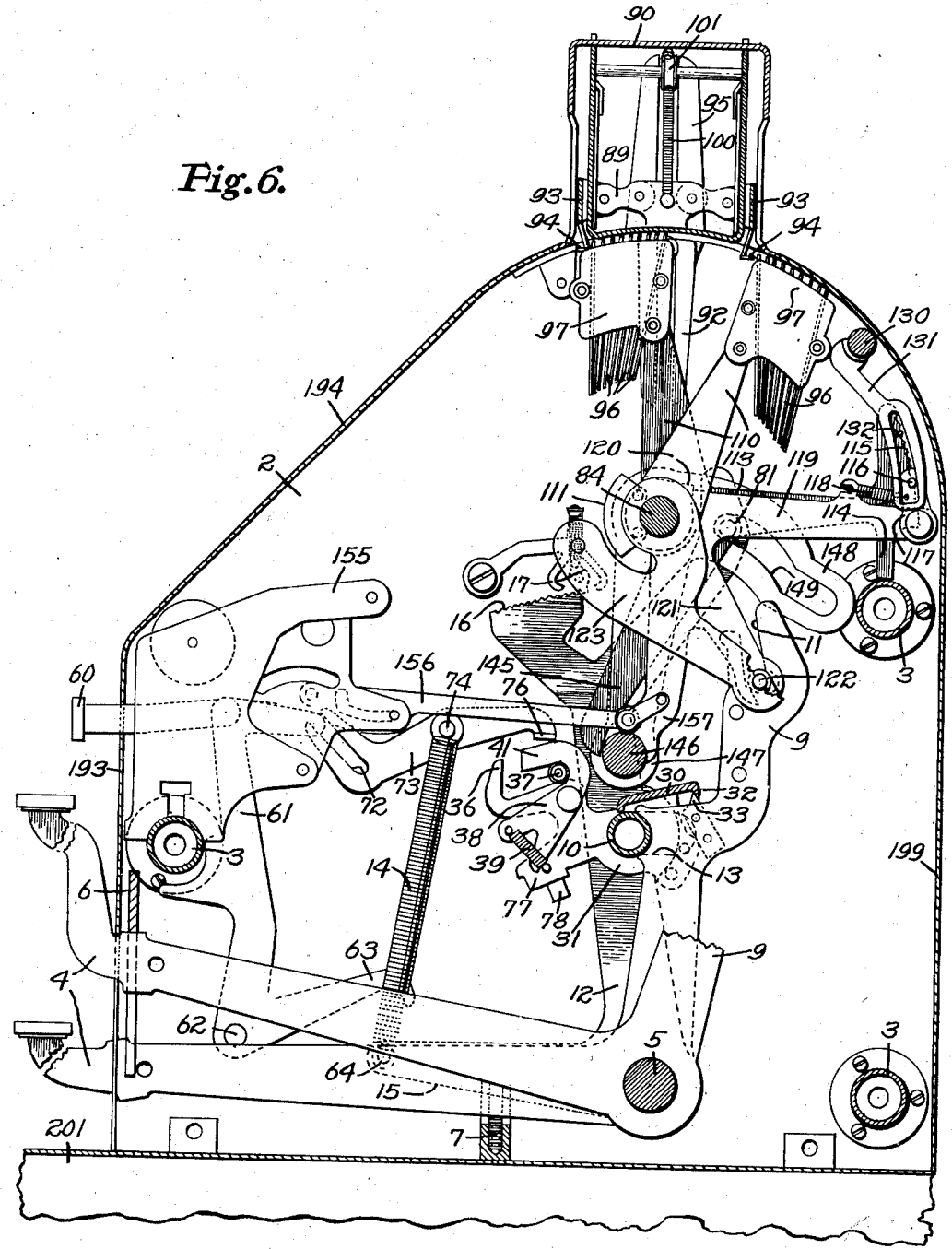
Figure 7:
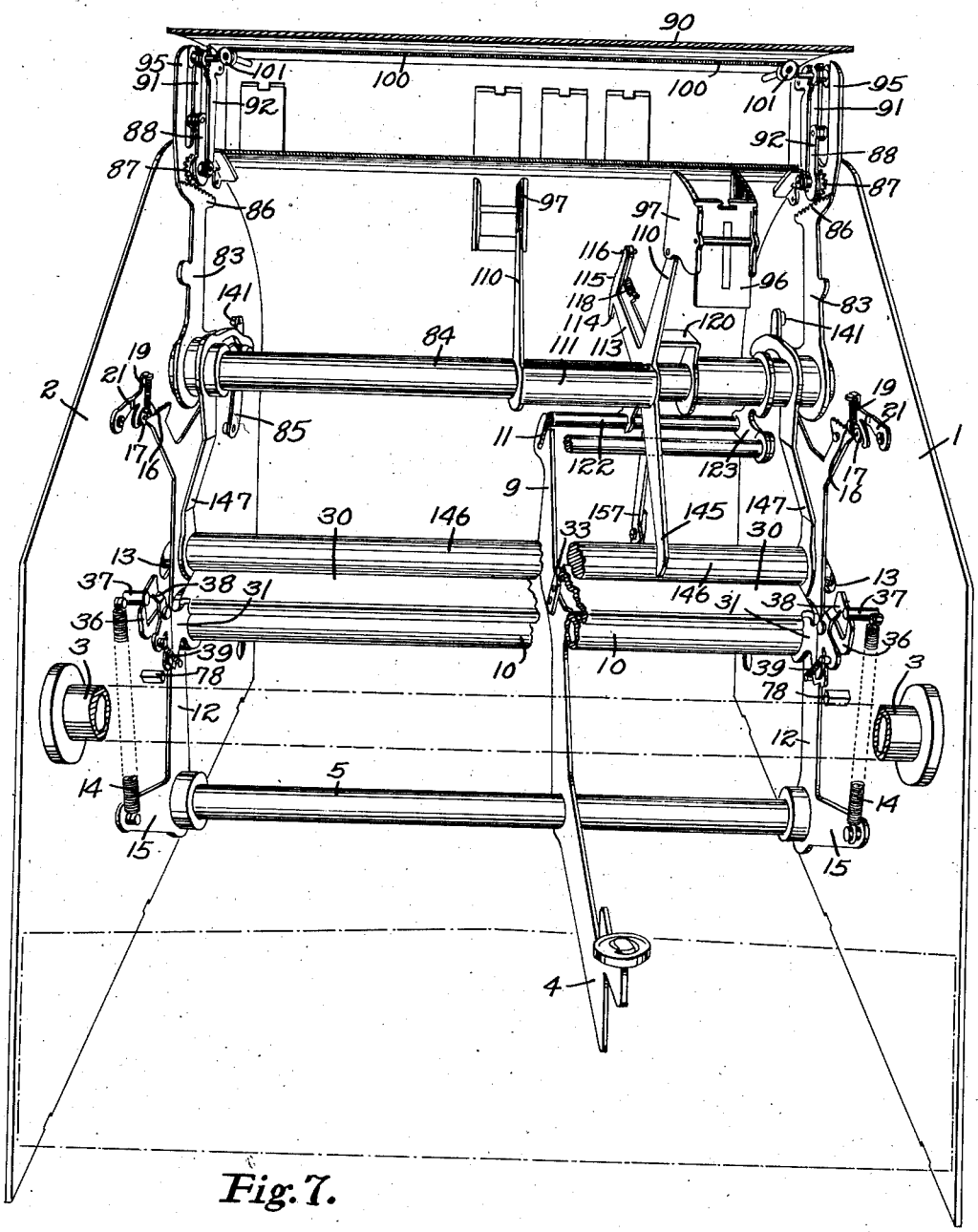

Fig. 3ª is a left side elevation of the upper portion of the indicator mechanism;

Fig. 4 is a right side sectional elevation illustrating the indexing means for the tab magazines and showing the latter in normal position;

Fig. 5 is a right side elevation partially in section illustrating certain of the mechanisms in position after the preset key has been depressed and released and before any of the digit keys have been depressed, the tab magazines and differential setting mechanism being omitted;

Fig. 6 is a right side sectional elevation with one of the digit keys in fully depressed position, certain of the mechanisms being omitted in order to bring out more clearly other parts;

Fig. 7 is a front perspective of the main driving elements and controls illustrating the driving and control connections provided at both sides of the machine.

Figure 9:
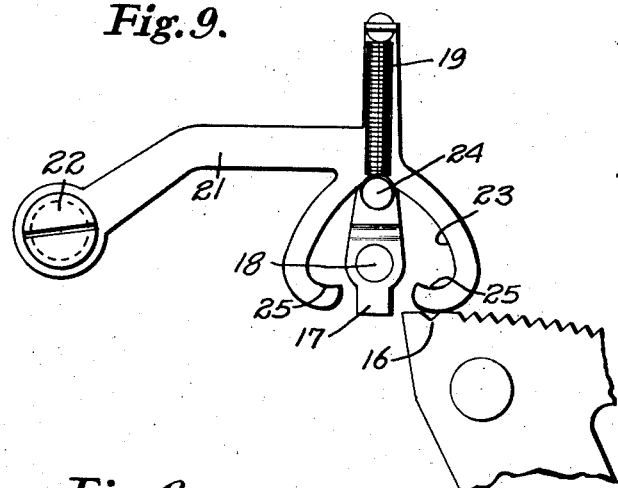
Figure 10:
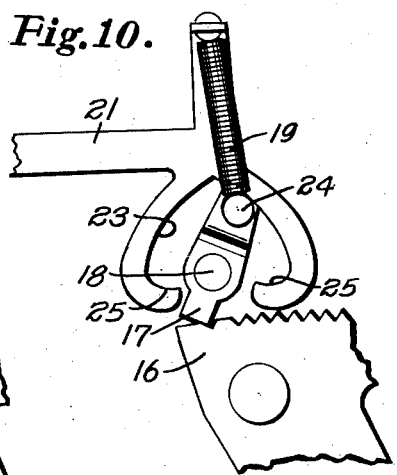
Figure 8:
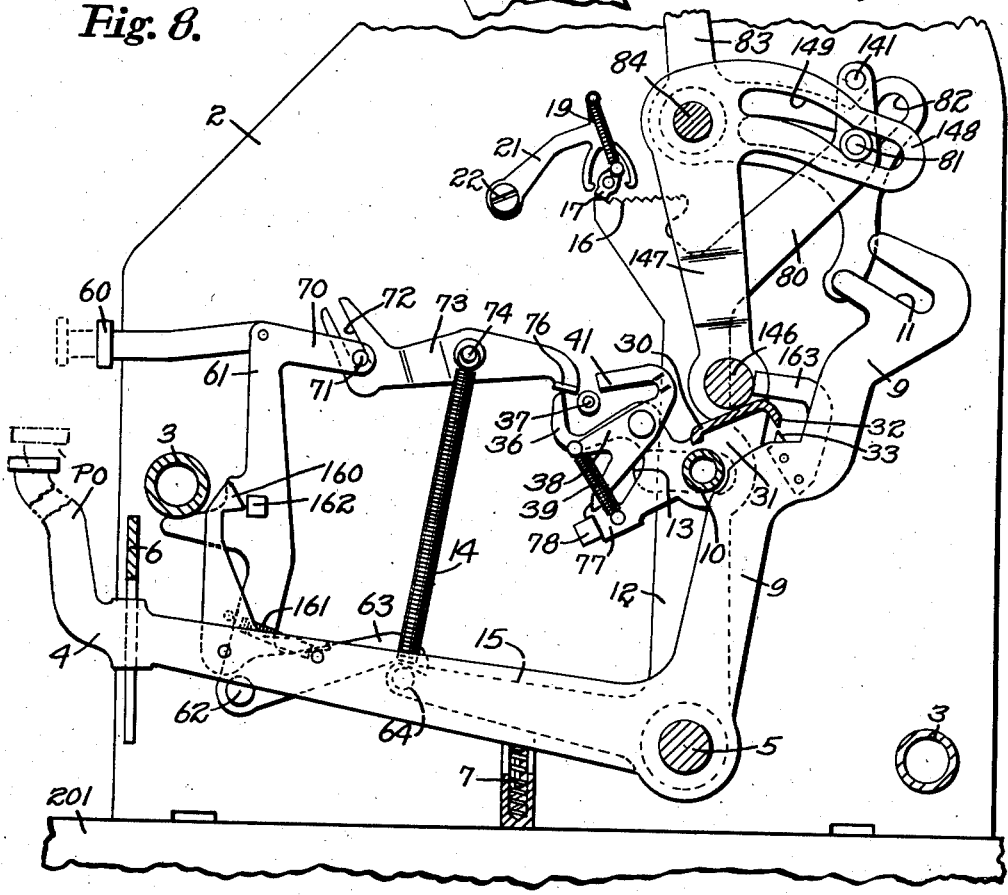
Figure 11:
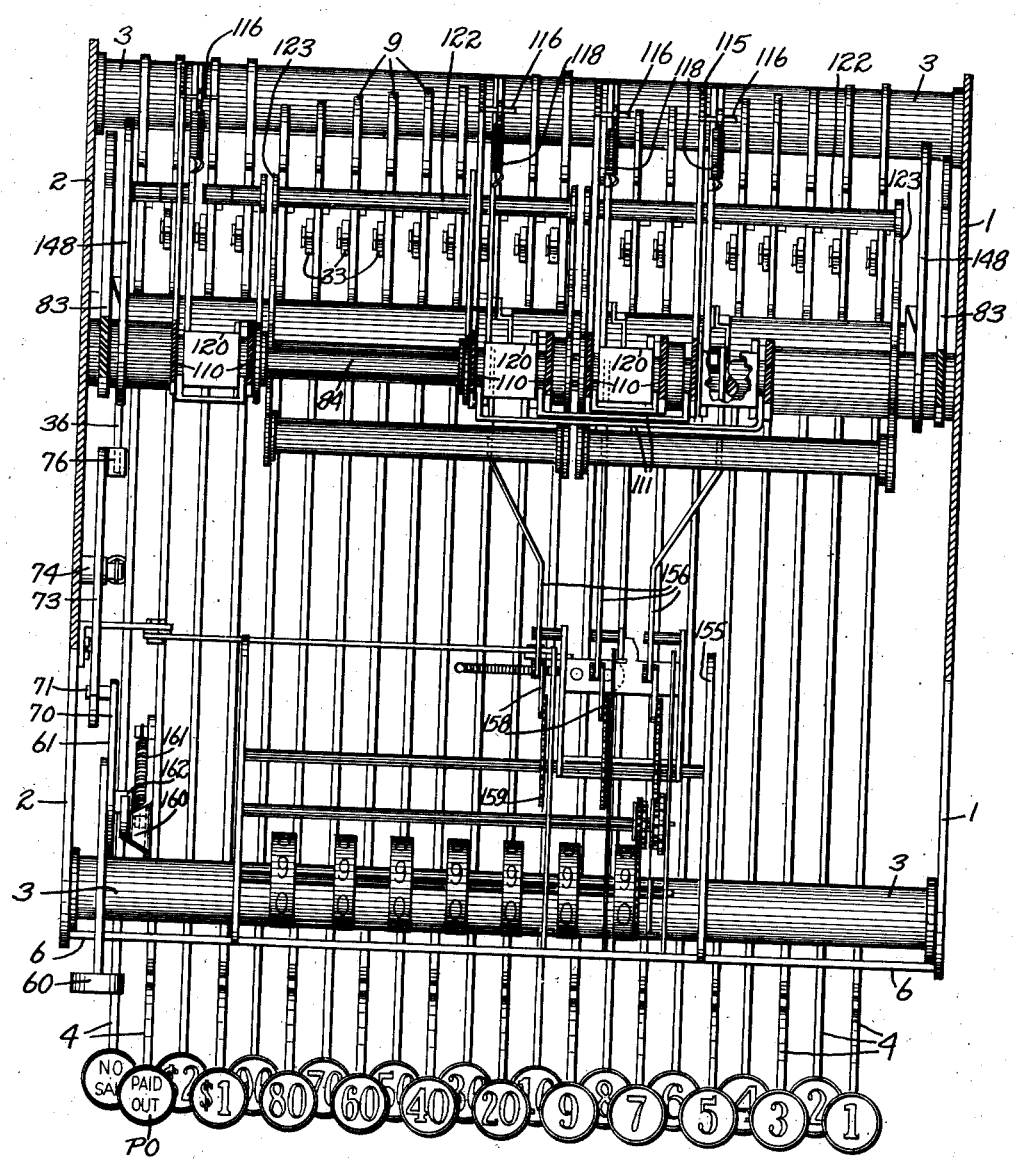

Fig. 8 is a partial side elevation illustrating in detail the paid-out key construction, showing it in partly depressed or preset position;

Figs. 9 and 10 are side elevations illustrating in detail the full stroke pawl and rack, Fig. 9 illustrating the pawl and rack in normal position, and Fig. 10 illustrating the pawl and rack in preset position; and Fig. 11 is a plan sectional view taken on line 11—11 of Fig. 4, illustrating the keyboard and associated mechanisms.

Light and uniform key action of a cash register is of extreme importance particularly where the machines are to be used continuously over a period of several hours by a single operator. The problems involved in providing an easy operating machine that is durable, free from trouble and accurate are, of course, manifold, particularly where the machine is subject to continuous and hard usage over long periods.

With the foregoing in mind, weight has been reduced to a minimum by reducing the weight of the individual elements and by reducing the number of elements, particularly those elements which are put in motion, thus also reducing the inertia to be overcome in starting the machine parts in motion by depression of the keys. The parts have been so constructed, arranged and combined as to offer minimum resistance to operation by the keys and the load upon the keys has been distributed substantially uniformly throughout the full depression and return movement of the keys.

General construction

One of the contributing factors in providing ease of operation is the reduction of weight in the machine generally. To accomplish this while maintaining absolute rigidity, the usual cast frame construction is supplanted by what may be termed an end plate construction which not only reduces weight while maintaining rigidity but increases speed of assembly and adaptability of the machine to different sizes or capacities with a minimum amount of change or substitution of parts. This construction also facilitates the storing of parts because there are no bulky frames to store and eliminates warpage of the frames while in storage or even after assembly.

Accordingly, the cash register mechanism is mounted and carried between right and left metal side plates 1 and 2, respectively, which support the entire mechanism and are maintained in spaced relation by tubular cross members 3 and by the various shafts constituting parts of the cash register mechanism.

Two rows of depressible keys 4 of the necessary number for each denomination are rotatably supported by a cross shaft 5 journaled in the end plates 1 and 2. The keys extend forward through a slotted front plate 6 (Fig. 11) and through the casing later to be described being provided at their forward ends with the usual finger tips.

The keys are urged clockwise about shaft 5 by compression springs 7, the upward movement of the keys being limited by the top of the slots in the comb plate 6. Each key has a rearwardly and upwardly extending arm 9 which engages a hollow cross shaft 10.

The upper end of each key lever terminates in a cam slot 11, the slot in each key being of a different inclination and/or depth and constitutes the means for differentially indexing the registers as well as indexing the visual indicators or tabs as will later be explained.

Shaft 10 is supported at each end by one arm of full stroke levers 12 secured to shaft 5 at each side of the machine. Shaft 10 extends through side plates 1 and 2 passing through arcuate slots 13 formed therein which slots limit the forward and backward movement of the shaft 10. Full stroke levers 12 and shaft 10 are constantly urged clockwise by springs 14 having one end of each attached to side plates 1 and 2 and the other end of each attached to lower arms 15 of full stroke levers 12. The shaft 10 and full stroke levers 12 constitute a universal bail that performs many functions in predetermined timed sequence as will hereinafter appear.

The upper ends of full stroke levers 12 terminate in full stroke racks 16 each engageable by a pawl 17 pivoted to each end plate 1 and 2 at 18 (Figs. 9 and 10) to insure a full stroke being made each time levers 12 are operated. Pawls 17 are urged to normal and vertical position by means of springs 19, the upper ends of which are connected to cam members 21 pivoted at 22 to the end plates 1 and 2 and having heart-shaped cam openings 23. The lower ends of springs 19 are attached to pins 24 carried by the upper ends of pawls 17.

As will be seen in Figs. 9 and 10, the shape of the cam openings 23 is such that the springs 19 tend to maintain pawls 17 in vertical position which is the normal position, in which position pins 24 lie in the point of the cam openings, being maintained there by the downward urge of springs 19 on cam members 21. Thus, the members 21 cooperate with springs 19 to serve to cam the pawls to vertical position or normal position. The inwardly projecting ends 25 of cam members 21 prevent overthrow of the pawls 17 by limiting the movement of the stud 24. The positive action of the cams in conjunction with the springs and the extremely short portion of the pawls below their pivots 18 cooperate to bring the pawls into action immediately upon a very slight movement of full stroke levers 12. When pawls 17 engage the first notches in the racks as is shown in Fig. 10 the machine is said to be in preset position.

It follows from the foregoing that depression of any of the keys 4 through their rearwardly upstanding arms 9 urges the universal bail comprising shaft 10 and full stroke levers 12 forwardly against the action of springs 14. The return movement of a depressed key differentially conditions the registers and positions the visual indicating tabs and other associated mechanism through the cam slots 11 as will later appear. After a full stroke has been taken as compelled by the full stroke racks, the depressed keys 4 are restored by springs 7 and the universal bail is returned by springs 14.

It will be particularly noted from Fig. 7 that the main actuating elements of the machine are controlled and actuated from both sides of the machine in order to prevent twisting, binding or any excessive torque. Therefore, even though any key lever which may be supported at any point along the cross shaft throughout the entire width of the machine is depressed it will produce the same turning effort on the cross shaft. In other words, there will be no more resistance to operation or actuation by depression of one key over that of any other key regardless of which key is depressed. This dual actuation and control from each side of the machine is carried throughout the construction as will be more apparent as the description proceeds and substantially eliminates excessive friction caused by twisting or torque of the various parts when in operation.

Key coupler

Another factor contributing toward the light and uniform key action is the novel key coupler employed.

It has been customary heretofore to employ heavy cast key couplers pivoted along or adjacent one longitudinal edge thereof and which must be raised bodily by depression of the keys to move the heavy coupler bodily into coupling position, the load being directly upon the keys.

It is proposed to use an extremely light weight coupler that is pivoted intermediate its longitudinal edges and which is substantially balanced about its pivot and which need only be rocked a very slight degree about its centrally located pivot as distinguished from moving bodily a heavy coupler to coupling position. By the proposed arrangement the energy necessary to place the machine in preset or coupling condition is reduced to a minimum and practically no load is placed upon the operating keys thereby.

With this in mind an extremely light normally inactive key coupler is provided which performs two functions. First, it serves to carry all partially depressed keys to fully depressed position when one key is fully depressed and second, it acts as a latch to latch preset keys in preset condition. On the other hand, it does not perform the function of preventing undepressed keys from being depressed after one or more depressed keys have been moved a predetermined distance. An independent interlocking device, later to be described, is employed for locking the undepressed keys against depression after a key has been moved past preset position. A further feature of the key coupler is that the coupler is not moved into latching position by the key levers but is simply released for such movement. This further contributes toward the lightness of the key action by reducing the load on the key.

Accordingly, a key coupler 30 is provided preferably made of sheet metal and in the form of a yoke extending across the entire width of the machine, the cross bar of which is channel-shaped and terminates in a pair of end arms 31 journaled upon the universal bail shaft 10 at a point intermediate the ends of the arms and the rear edge of the coupler 30 so that the coupler is substantially balanced and may be rocked about shaft 10 with very little effort. The rearwardly and downwardly extending edge or lip 32 of the cross member of the coupler is adapted to engage lugs 33 extending upwardly from each of the key levers. The coupler is urged clockwise by a pair of springs 34, one at each end of the coupler so as to normally urge lip 32 toward engagement with lugs 33. The key coupler, however, is held disengaged from the key levers as shown in Fig. 4 by forwardly and upwardly extending fingers 36 formed integrally with arms 31, which fingers when the machine is in normal position, engage studs 37 fixed to and extending inwardly from the end plates 1 and 2 to withhold the coupler from latching or coupling position.

Upon forward movement of shaft 10 caused by the initial depression of any key, the forwardly extending fingers 36 move away from studs 37 and the key coupler is thereby unlatched or permitted to rotate clockwise by the action of springs 34. This causes the coupler to drop behind lugs 33 of all depressed keys and to remain in this position during the entire downward and return stroke of the keys. At the end of the return stroke, fingers 36 re-engage studs 37 and rock the key coupler counterclockwise to normal or inoperative position at which position the coupler is disengaged from lugs 33. The coupler being in engagement with lugs 33 on the downward stroke of the keys causes all partially depressed keys to be carried to fully depressed position if any one key is fully depressed. Furthermore, it acts as a latch to retain any partially depressed keys in partially depressed or preset condition. In other words, the coupler makes it necessary to depress only one key the full downward stroke in order to carry all depressed keys down the full stroke and permits presetting of several keys, thus permitting the operator of the cash register to partially depress or preset any number of keys and then carry them all to final depressed position by the use of only one hand. This insures complete depression of all keys even though the operator may depress simultaneously two or more keys with unequal pressures.

Coupler overthrow prevention

To prevent overthrow of the key coupler due to a rapid depression of one of the key levers or any other means and restoration of one or more previously depressed keys, the left arm 31 of the coupler is provided with a pivoted lever 38 urged counterclockwise by a spring 39 so as to hold its projecting finger 41 into engagement with the stationary stud 37. Spring 39 is relatively weak and is only of sufficient strength to urge finger 41 into engagement with stud 37 and offer a yielding resistance to counterclockwise rotation or overthrow of the coupler. Upon clockwise rotation of the coupler, finger 41 clears stud 37. Upon return movement of a key lever spring 39 permits rocking of lever 38 so that it may again position itself in the rear of stud 37. Finger 41 also yields when the preset key is operated as will be later described.

Key lock

It is necessary to provide some means to prevent depression of other keys during completion of the downward stroke of one key. As previously stated, this is not accomplished by the key coupler as in many cash registers. During the early part of movement of a key in being depressed, the lip 32 of key coupler 30 moves behind lugs 33 of all depressed keys. As the key depression continues it carries all depressed keys downwardly with the one being depressed. At this time all undepressed keys should be and are blocked.

For this purpose a blocking bail 50 (Figs. 4 and 5) extending across the machine is pivoted at 51 to each side frame of the machine. The bail is provided with an upstanding lug 52 for each key lever, each lug being engageable with a pin 53 extending laterally from each key. The bail is normally urged and held in disengaged position by a spring 54 at each end which tends to rotate the bail counterclockwise about its pivot.

During initial depression of any key a crank is rotated as will be later explained which engages a finger 57 extending forwardly from one end of bail 50 and following preset movement rocks the latter clockwise causing its lugs 52 to engage pins 53 of all undepressed keys to prevent depression of any keys which have not been partially depressed. At the extreme end of the return stroke of the depressed key the crank leaves finger 57 and permits bail 50 to resume its normal position under the influence of springs 54.

By relieving the bail or key coupler of the usual function of blocking the keys and utilizing instead a spring pressed independent bail which is merely caused to be operative upon movement of the keys, the key action is relieved of further work and the key action is therefore lightened.

Presetting of keys

When entering an amount in the machine of two or more figures, it is not always convenient for the operator to use both hands to depress the necessary keys and frequently the two keys to be depressed are not within the reach of the fingers of one hand. Provision has been made, therefore, to enable the operator to "preset" one or a plurality of keys whereby the keys that denote the amount to be entered may be partially depressed and then any one key fully depressed to carry all the keys down to enter the entire amount.

It will be understood from the foregoing description that the key coupler functions to cause all partially depressed keys to be fully depressed upon full depression of any one key.

The point at which the key coupler latches all partially depressed keys thereto is rather difficult to determine unless some indication is given, moreover, it is preferable to preset the machine, that is, move the key coupler to preset position prior to depressing any keys whereby any keys may thereafter be depressed to preset position, i. e., partially depressed and latches to the key coupler.

In the present invention a separate preset key 60 is employed for placing the machine in preset condition, which key is pivoted to a crank 61 and upon being pushed inwardly rocks crank 61 clockwise about its pivot 62 causing a rearwardly extending arm 63 to engage a stud 64 carried by the forward end of arm 15 of the left full stroke lever. The pivotal points and lengths of the levers are such that full stroke lever 12 and shaft 10 are moved forward until pawl 17 engages the first notch in the full stroke rack 16 at which point coupler 30 is permitted to rock clockwise because finger 36 is then free of stud 37.

This position of the machine is known as preset position or condition and is illustrated in full lines in Fig. 5 which figure also illustrates in dotted lines the positions of the parts taken when the preset key 60 is depressed.

In this position the key coupler has been rocked clockwise with its lip 32 below lugs 33 but inasmuch as the coupler may be rocked upwardly as well, depression of any key will rock the coupler and cause its key lug 33 to be placed in front of lip 32 and be latched thereby in preset position. In order to prevent depression of a key of the units order from releasing depressed or preset keys of the tens or higher orders, the coupler lip 32 is stepped progressively from one end to the other, there being one step for each denomination of keys. When in preset condition shaft 10 which is normally in contact with the key levers has been moved forwardly by presetting the machine and constitutes a limiting stop for the other keys. The shaft thus provides an unmistakable indication of when the key levers reach a preset position.

*Correction of errors*

It is frequently desirable to cancel an entry or correct a key when in preset condition. Accordingly, the special preset key is constructed to release any keys which may have been preset, whereby a correction may be made or an error corrected by the use of the preset key. For this purpose crank 61 is provided with a rearwardly extending arm 70 which carries at its extreme end a pin 71 engageable in a cam slot 72 formed in a lever 73 pivoted at 74 intermediate its ends to the left side frame 2. The rear end of lever 73 is provided with a laterally extending lug 76 which overlies finger 36 and upon depression of preset key 60 engages and rotates arm 31 of the coupler and consequently rotates the entire coupler counterclockwise about shaft 10, sufficiently to release all keys which may be latched by the rear lip 32 of the coupler.

When fully depressed, preset key 60 also locks the key coupler against further forward rocking movement by moving shoulders 77 formed on arms 31 of the key coupler downwardly immediately in the rear of square lugs 78 projecting inwardly from each side plate 1 and 2. All keys are therefore locked against further depression as long as the preset key is held fully depressed.

The key coupler and preset mechanisms are not described in greater detail, being made the subject matter of my copending application, Serial No. 689,657 filed September 15, 1933, to which reference is made for further details.

*Indicator mechanism*

The indicator mechanism is designed to be read in correct reading direction from either side, i. e., front or rear, of the cash register and is furthermore constructed so as to place very little load upon the key levers and to distribute what load there is over substantially the full stroke of the key lever. The indicating tab raising mechanism is also so balanced and constructed as to substantially eliminate the effects of inertia in raising the tabs from lower position. Furthermore, the tab magazines are so balanced as to require very little effort in shifting from one extreme position to the other although the shifting is positive in action and does not rely upon gravity.

Each of the full stroke levers 12 is provided at their upper and rear ends with rearwardly and upwardly extending arms 80 carrying studs 81 which project laterally on both sides of the arms. Upon one side of the arms, studs 81 engage in cam slots 82 formed in each of two cranks 83, one being at each side of the machine, pivoted upon a shaft 84 extending across the machine (Figs. 3, 4, 5 and 6). Cam slots 82 are so shaped that cranks 83 are moved during the initial portion of depression of a key and are thereafter not moved until at the end of the return movement of the key lever. Cranks 83 have depending arms 85 that carry studs which engage fingers 57 to rock the blocking bail 50.

The upper arms of cranks 83 are provided with toothed sectors 86 meshing with pinions 87 disposed at each side of the machine and pivoted upon studs secured to the side frames 1 and 2. To each gear 87 is secured an arm 88 which is connected to an indicator bail 89 by a link 91 whereby reversed rotation of gear 87 will reciprocate bail 89 within an indicator frame 90. Bail 89 extends across the width of the machine and is guided for vertical and reciprocatory movements within the frame 90 by means of forked slides 92 and guide ways 95 that are fastened to the side frames 1 and 2.

The bail 89 is provided with a cross arm 93 on each side of the indicator frame 90, each cross arm being colored so as to be readily visible for reasons later to appear and being provided with downwardly extending hooks 94 for each denomination of tabs for selectively engaging indicator tabs 96. The tabs are contained in differentially movable tab magazines 97, coupled in pairs, there being a magazine on each side of the machine for each denomination, that is, one for the cents, one for the dimes and one for the dollars, so arranged that the indicator tabs may be read in reading direction from left to right from both the front and rear of the machine. The magazines for the same denominations are carried by integral yokes so that they are indexed or differentially positioned simultaneously as will appear in more detail hereafter.

During the initial portion of a key depression to preset position, bail 89 is immediately lowered as shown in Figs. 5 and 6 due to the immediate action of cranks 83. In this position arms 93 will be visible and being easily detectable will give notice to the clerk, manager and customer that a transaction has not been completed. During the remaining portion of the downward stroke of the key levers, the bail remains in lowered position due to the dwell in cam slots 82 in cranks 83. Also during the remaining portion of the downward stroke of the key levers, the tab magazines are returned to normal position as will appear more fully hereafter. During the initial portion of the upward movement of the key levers, the indicator bail still remains lowered and the tab magazines are moved to indexed positions. At the final portion of the upward movement of the keys the tabs are picked up by the hooks 94 and raised to visible position to indicate the amount entered into the machine by depression of the keys.

To substantially balance bail 89 so as to minimize any load placed thereby on the key levers and to overcome the effects of inertia in raising the tabs from lowered position, a long tension spring 100 (Fig. 6) is stretched across the top of the indicator bail, over two pulleys 101, one at each end thereof, and is connected at its ends to the indicator bail 89. The spring exerts a slight upward pull upon the bail particularly when in its lowermost position where it is necessary to overcome the inertia of the bail against starting in upward direction from stationary lowered position. The spring, does not affect the tab magazines which are freely journaled as will be described more in detail hereafter. However, it is well to mention at this point that the mechanism for raising and lowering the bail due to the gear and rack offers some slight retardation to the upward or return movement of the keys and therefore acts as a sort of damper to restrict the keys against too rapid return movement.

Indicator indexing

The indexing of the tab magazines is also constructed and timed so as to place very little load upon the keys and to distribute what load there is upon those portions of the key depression when little else is being accomplished thereby. As previously stated, there are a pair of tab magazines for each denomination, that is, a pair for the cents tabs, a pair for the dimes tabs and a pair for the dollars tabs, each magazine of each pair, of course, having a full set of tabs ranging from 1 to 9, the zeros being permanently placed upon the indicator frame in full vision at any time that no other tab is placed in front thereof. The tab magazines are preferably constructed of some relatively light weight material such as "Bakelite" or other suitable material having a low moment of inertia. The magazines are slotted to receive the tabs in spaced relation, the tabs being partially in the slots when in fully raised position, thus retaining the tab magazines in indexed position when the tabs are in raised or visual positions.

The indexing of each pair of magazines is substantially the same and therefore will be described in connection with only one pair. A pair of magazines for each denomination is secured to the upper ends of arms 110 of a yoke 111 (Figs. 4, 6 and 7), the yoke being freely journaled on stationary shaft 84 extending across the machine. The magazines being in pairs one forward and the other rearward of shaft 84 substantially balance each other. The magazines, however, are slightly off balance and will ordinarily automatically return to zero or normal home position by gravity at each operation of the machine without a load being placed on the keys, although means are provided for positively returning the magazines to zero at each operation as will be explained. The tendency to rotate to normal position is very slight and, the magazines being made of a relatively light material, very little energy is necessary to move them to indexed position. Yoke 111 has a rearwardly extending arm 113 provided with a depending finger 114 which engages one of the tubular spacing shafts 3 to limit the clockwise movement of the yoke and magazines carried thereby. The free end of arm 113 is provided with rack teeth 115 adapted to be differentially engaged by a pin 116 carried upon the end of a link 117 normally urged counterclockwise by a spring 118 to engage pin 116 with teeth 115.

Link 117 is pivoted to the outer end of an arm 119 of an indexing yoke 120 having a forked arm 121 engaging a bail 122 carried by arms 123 freely journaled on shaft 84 and which extends across all of the keys of one denomination. Bail 122 is in position to be engaged by any one of the differential cam slots 11 formed in the upper extensions of the keys within one denomination. It will be understood that there is a yoke 121 and a corresponding bail 122 for each denomination of keys, that is, for the cents keys, the tens of cents keys, and the dollars keys, and that each pair of magazines 97 will be indexed according to the key depressed in the corresponding denomination.

Means must be provided controlling the indexing pins 116 to release pins 116 from the rack teeth 115 and permit the magazines to resume normal positions at each operation of the machine and to re-engage pins 116 with racks 115 in time so that the magazines will be moved to indexed position prior to raising of the indicator bail. For this purpose a shaft 130 is journaled in the side plates 1 and 2 adjacent the upper ends thereof to which is rigidly secured an arm 131 for each pin 116. Each arm has an elongated wedge-shaped closed cam slot 132 of sufficient length to receive pin 116 throughout its full stroke, pin 116 being extended through both sides of arm 117 for this purpose. Adjacent the left-hand end of shaft 130 an arm 133 is rigidly secured thereto carrying a pin 134 at its outer end which pin projects through a cam slot 135 in the upper end of a lever 136 pivoted at 137 to the left end plate 2. A tension spring 138 connected at one end to pin 134 and at its other end to pivot pin 137 tends to rotate shaft 130 counterclockwise to urge pins 116 out of engagement with teeth 115.

Lever 136 has a pass-by pawl 139 pivoted to one lower end thereof which pawl is free to rotate counterclockwise but cannot rotate clockwise, relatively to the lever. Pawl 139 is in position to be engaged by a stud 141 projecting laterally from the upper end of arm 80 of the full stroke lever 12 immediately after the first portion of the forward stroke of the full stroke lever and after the indicator bail has been lowered to replace the tabs in the magazines. Engagement of stud 141 with pass-by pawl 139 rocks lever 136 counterclockwise and permits counterclockwise rotation of shaft 130 under action of spring 138. During the time that shaft 130 is in this position the magazines are free and are permitted to rotate by gravity being positively restored if necessary to normal position. At the last portion of the forward movement of the full stroke lever, stud 141 engages a hooked finger 142 on lever 136 and rotates lever 136 clockwise causing clockwise rotation of shaft 130 and re-engagement of pins 116 with rack teeth 115 which pins have in the meantime been indexed so that upon re-engagement they will engage the proper rack teeth to index the pairs of tab magazines, according to the keys depressed.

The movement of the tab magazines to indexed position takes place upon the first portion of the upward movement or return movement of the key levers and the tabs are raised at the final upward movement of the key lever due to the shape of cam slot 82. What little load is placed upon the key levers by the indexing mechanism and movement of the magazines is therefore distributed over the full stroke of the key levers, except the very initial and final portions of the movement which portions are used to raise and lower the tabs and place the machine in preset condition and thereafter block all undepressed keys.

To insure a positive return of these magazines to normal position at each operation of the cash register, the magazine yokes 111 are provided with downwardly projecting arms 145 positioned to be engaged by a return bail 146 extending across the machine and supported at each end by one arm 147 of cranks disposed at each side of the machine and journaled on shaft 84. The other arms 148 of the cranks have cam slots 149 therein into which extend the projecting ends of studs 81 carried by the full stroke levers. Upon oscillation of the full stroke levers which occurs once for each machine operation, crank arms 148 and 147 are rotated to swing bail 146 into contact with those arms 145 which may be in the path of movement of the return bail 146 by reason of the magazines not having dropped to normal position by gravity. The return bail 146 is in a sense a secondary actuator whereas the universal bail is the primary actuator. The indicating mechanism is not described in greater detail being made the subject matter of my copending application, Serial No. 689,658, filed September 15, 1933, to which reference is made for further details.

Register indexing

A register 155 (Figs. 4 and 6) for accumulating and totaling the amounts entered into the machine is secured to the side frame of the machine adjacent the front thereof and is of the type that requires very little energy to operate and which may be cleared by one full stroke of a clearing lever. Each of the register wheels of the register is actuated through a link 156 pivoted at one end to arm 157 depending from each of the yokes 120. The opposite end of link 156 is connected to the register wheels through a toggle link 158 and rack 159. The toggle link may be disabled for non-add purposes such as when paid-out operations are performed in the machine. The specific register operating means and controls are not described in greater detail, being made the subject matter of my co-pending application, Serial No. 689,659 filed September 15, 1933, to which reference is made for further details.

Character indications

In the illustrated machine, there is a special magazine for the character tabs to indicate the type of operation or entry being made in the machine. There are three types of entries indicatable in the present machine, namely, a cash transaction, a no-sale transaction, and a paid-out transaction. The cash tab is permanently fastened in the indicator frame whereas the no-sale and paid-out tabs are disposed in an independent tab magazine operated in the same manner described in connection with the amount tab magazines.

No-sales key

The no-sale key (Fig. 11) functions to cause the no-sale tab to be raised from the character magazine. This key also operates a pendant interlock (not shown) slidable below the front end of all the other keys to prevent depression of any amount keys simultaneously with depression of the no-sale key.

Paid-out key

Contrary to the no-sale key, it is desired to enforce the depression of an amount key whenever a paid-out transaction is made. Accordingly, the paid-out key P. O. is interlocked with the present key 60 by means of the latching pawl 160 (Figs. 4, 8 and 11) pivoted to the paid-out key and normally urged by a spring 161 into latching relation with a stud 162 projecting from the side of crank 61 thereby necessitating depression of the preset key to remove stud 62 from the path of latching pawl 160. By depressing preset key 60, crank 61 is moved forward to carry stud 162 out of engagement with latching pawl 160 after which the paid-out key may be depressed to preset position to latch it to the key coupler. Further depression of the paid-out key is prevented, however, by contact of the forwardly projecting finger 163 secured to the rear and upper arm of the paid-out key lever with return bail 146, the rear upper arm of the key lever being cut away so as not to engage hollow shaft 10 whereby the key coupler and shaft 10 are not moved forward. It is, therefore, necessary to depress an amount key which will register and indicate an amount and carry with it the paid-out key which is latched to the coupler because of the depression of the preset key throughout full depression of the amount key.

Item counters

As can be seen from Fig. 3 several item counters are provided at the left side of the machine, three such counters being shown and indicated at 170, 171 and 172 mounted in a frame 173 constructed to accommodate five counters, the frame being secured to the left end plate 2. In the illustrated machine, counter 170 is utilized to count each and every item entered into the machine or rather every operation performed on the machine whether it be a cash, a no-sale or a paid-out operation, in order that a store manager or supervisor may know exactly how many times the machine was operated. Counter 170 is operated through a slide 174 slidably mounted in the frame 173 directly beneath the item counters and having a forked connection with an arm 175 of counter 170. Slide 174 is actuated by a crank 176 pivoted at 177 to the side frame 2 and actuated the return bail 146 which as has been previously stated, is moved at each operation of the machine.

Counter 171 is utilized to count the paid-out operations and is operated through a slide 179 similar to slide 174 and operated by means of a crank 181 pivoted at 177 and having a rear arm 182 engaging a stud 183 carried by the paid-out key so that each operation of the paid-out key will rotate counter 171 one unit.

Counter 172 is utilized to count the no-sales transactions by means of a similar slide 184 and crank 186 adaptable to the no-sale key.

Operation

Summarizing the distribution of the operative loads of the various elements throughout the entire key action; at the initial depression of an amount key from normal to preset condition, the universal bail including full stroke levers 12, and shaft 10 and key coupler 30 are moved forward slightly until the full stroke pawls 17 engage the first notches in the full stroke racks 16. This slight movement of the full stroke levers 12 also rocks cranks 83 which lowers the indicator tab bail 89. Upon the very next portion of the downward movement of the keys and within the limits of the next two or three notches of the full stroke racks, shaft 130 is rocked by the levers to release pins 116 from the differential rack teeth 115 thus permitting the tab magazines to drop by gravity or be positively moved if necessary by return bail 146 to normal position. The preparatory work of setting the machine in condition to be indexed, that is, to have the registers and tabs indexed, has been accomplished by the universal bail during these first two portions of the key stroke. This condition and the position of the machine is illustrated in Fig. 5 with the exception that the condition has been reached by depression and release of the preset key and accordingly the key levers are not in contact with shaft 10 as would be the case with one amount key had the condition of the machine been reached by gradual depression of an amount key. During the first portion of the downward stroke of the keys following preset movement, the blocking rail 50 is also moved upwardly to block all undepressed keys.

During the remainder of the down stroke of the keys, the major or primary operations are performed, that is, the tab magazines, indexing yokes and pin arms 119 are indexed by engagement of bail rod 122 in the cam slots of the depressed key levers. Furthermore, the register links are indexed, i. e., the registers are actuated through toggle links 158 moved by arms 157 and links 156.

At the completion of the downward stroke of the keys (Fig. 6) and just after the magazine pin arms 119 have been indexed, shaft 130 is again rocked by the universal bail to move pins 116 into engagement with rack teeth 115.

Upon the first portion of the upward stroke of the keys the energy for which stroke has been stored up in springs 7 and 14 during the downward stroke, the tab magazines are moved to the indexed positions as determined by the pin arms 119 and the totalizing registers are, in part at least, also rotated to indexed position upon the first portion of the upward stroke of the keys. At the latter portion of the upward stroke the indexing of the registers is completed and the tab bail is then raised to pick up the tabs as indexed and raise them to visible position, the bail being aided in its upward movement by spring 100. It is to be noted that during the final portion of the key movement in upward direction the universal bail, the indicator bail, and tabs, and the key levers are the only parts being moved.

From the foregoing discussion it will be apparent that the work performed in operating the machine is distributed throughout the full oscillation, that is, up and down movement of the key levers, therefore making for a uniform action. The distribution of the work throughout the entire key action makes it possible to use lighter springs 7 and 14 inasmuch as it is not necessary to store up as much energy upon the down stroke as would be the case if all of the movement were to take place on the up stroke. Furthermore, it reduces the energy necessary to depress the keys if all of the work was to be accomplished on the down stroke of the keys. The even distribution of the work upon the keys therefore contributes greatly to the ease of key action as does the construction and arrangement of the parts or elements of the mechanism including the reduction in weight of the parts and the balancing of the several parts, both of which reduce the energy necessary to move the parts and overcome the moment of inertia in starting the parts from stand still into motion.

Casing

The entire mechanism thus far described is enclosed in a sectionalized casing secured to the side frames 1 and 2 and comprising two side plates 190 and 191 which are similar except that one is for the right side and one for the left (Figs. 1 and 2), a lower front panel 193, an upper hinged front panel 194 to which a bar 196 is secured for fastening a memorandum pad to the panel, a removable indicator housing 197 having the usual front and rear glasses 198, and a rear panel 199 which completes the enclosure for the cash register mechanism. The cash register mechanism is mounted on top of the cash drawer 200 enclosed within a cash drawer housing comprising a top flanged plate 201, a bottom flanged plate 202, between which is secured a U-shaped side wall member 203. The casing structure and drawer housing and the mounting are not described in greater detail, it being made the subject matter of my copending applications, Serial Nos. 689,662 and 689,663 both filed September 15, 1933, to which reference is made for further details, if necessary.

Drawer latch

To further minimize the load upon the keys the cash drawer is retained in closed position by a latch mechanism which offers practically no resistance to releasing movement. This latch mechanism comprises a locking shaft secured against bodily movement while permitted to rotate about its axis and having a half round end 205. A slotted latch plate cooperates with the shaft and is adapted to receive and release the half round end 205 when turned to one position and to retain the half round end 205 when the shaft is turned to another position. Rotation of the shaft is controlled by the cash register mechanism. The latch mechanism is not shown or described in greater detail, being made the subject matter of my copending application, Serial No. 689,664 filed September 15, 1933, and is mentioned only to further emphasize the fact that the entire combination, construction and arrangement of elements is such as to reduce load upon the operating keys and to thereby contribute toward ease of key action.

It will be apparent to those skilled in the art that many modifications may be indulged in the details of construction of the various elements of the mechanism without departing from the spirit and scope of this invention as defined in the appended claims.

I claim:

1. A key operated cash register having a shaft, a plurality of banks of depressible keys supported thereby, a universal bail comprising a cross shaft and a supporting arm adjacent each end of said shaft, said keys being arranged to engage said cross shaft between said arms to move said bail, a single normally inoperative key coupler journaled on said shaft, said coupler being coextensive with and adapted to engage all of said keys and having means for latching the keys of all banks when said keys are depressed either simultaneously or consecutively for enforcing full depression of all partly depressed keys of all banks upon full depression of any one key.

2. A key operated cash register having a shaft, a plurality of banks of depressible keys supported thereby, a universal bail comprising a cross shaft and a supporting arm adjacent each end thereof, said keys being arranged to engage said cross shaft between said arms to move said bail, a single key coupler journaled on said shaft and having means thereon for enforcing full depression of all partly depressed keys of all banks upon full depression of any one key, and spring means urging said coupler into operation position.

3. A key operated cash register having a shaft, a plurality of banks of depressible keys supported thereby, a universal bail comprising a cross shaft and a supporting arm adjacent each end of said shaft, said keys being arranged to engage said cross shaft between said arms to move said bail, and a single substantially balanced key coupler journaled on said shaft, said coupler being coextensive with and adapted to engage all of said keys when said coupler is in one position and having means for latching the keys of all banks when said keys are depressed either simultaneously or consecutively for enforcing full depression of all partly depressed keys of all banks upon full depression of any one key.

4. A key operated cash register having a shaft, a plurality of banks of depressible keys supported thereby, a universal bail comprising a cross shaft and a supporting arm adjacent each end of said shaft, said keys being arranged to engage said cross shaft between said arms to move said bail, a single substantially balanced key coupler journaled on said shaft and having means for latching the keys of all banks when said keys are depressed either simultaneously or consecutively for enforcing full depression of all partly depressed keys upon full depression of any one key, yielding means for urging said coupler into operative position, and means for normally retaining said coupler in inoperative position.

5. A key operated cash register having depressible amount keys, a key coupler, means for moving said coupler to preset position, a depressible paid out key, means for latching said paid out key to prevent depression thereof until operation of said first means, and means for limiting depression of said paid out key to preset position and enforcing the depression of one of said amount keys.

6. A key operated cash register having depressible amount keys, a key coupler, said coupler being movable to preset position upon depression of an amount key, independent means for moving said coupler to preset position, a depressible paid out key, said coupler being unaffected by depression of said paid out key, and means for latching said paid out key to prevent depression thereof until operation of said independent coupler moving means, and means for limiting depression of said paid out key to preset position and enforcing the depression of one of said amount keys.

7. A key operated cash register having depressible amount keys, a key coupler, an independent preset key, means for moving said coupler to preset position, a depressible paid out key and means for latching said paid out key to said preset key to prevent depression thereof until operation of said preset key, and means for limiting depression of said paid out key to preset position and enforcing the depression of one of said amount keys.

8. A key operated cash register having depressible keys, a universal bail actuated thereby, indicator tabs, a pair of tab magazines for each denomination freely journaled for rocking movements, means under control of said keys for indexing said magazines, a return bail actuated by said universal bail for positively returning said magazines to normal position at each operation of said machine, an indicator bail for raising and lowering said tabs out of and into said magazines at each operation of said machine, and a counter for counting predetermined operations of said machine operated by said return bail.

WALTER J. PASINSKI.